United States Patent
Cerreta

(10) Patent No.: US 11,209,076 B2
(45) Date of Patent: Dec. 28, 2021

(54) WASHER ASSEMBLY AND HYDRODYNAMIC TORQUE CONVERTER

(71) Applicant: Schaeffler Technologies AG & Co. KG, Herzogenaurach (DE)

(72) Inventor: Joshua Cerreta, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/262,316

(22) PCT Filed: Sep. 14, 2018

(86) PCT No.: PCT/CN2018/105698
§ 371 (c)(1),
(2) Date: Jan. 22, 2021

(87) PCT Pub. No.: WO2020/051871
PCT Pub. Date: Mar. 19, 2020

(65) Prior Publication Data
US 2021/0293315 A1  Sep. 23, 2021

(51) Int. Cl.
| F16H 41/24 | (2006.01) |
| F16C 17/04 | (2006.01) |
| F16D 33/18 | (2006.01) |
| F16H 41/04 | (2006.01) |

(52) U.S. Cl.
CPC .......... *F16H 41/24* (2013.01); *F16C 17/04* (2013.01); *F16D 33/18* (2013.01); *F16H 41/04* (2013.01)

(58) Field of Classification Search
None
See application file for complete search history.

(56) References Cited

U.S. PATENT DOCUMENTS

| 6,394,660 B1* | 5/2002 | Butler, III | F16C 19/30 384/620 |
| 7,581,391 B2* | 9/2009 | Kawamura | F16H 41/24 60/330 |
| 9,765,871 B2* | 9/2017 | Simon | F16H 41/24 |
| 9,903,455 B2* | 2/2018 | Dattawadkar | F16H 41/24 |

(Continued)

FOREIGN PATENT DOCUMENTS

| CN | 102537301 A | 7/2012 |
| CN | 203743364 U | 7/2014 |

(Continued)

*Primary Examiner* — Michael Leslie
(74) *Attorney, Agent, or Firm* — Lekeisha Suggs

(57) ABSTRACT

A washer assembly and a hydrodynamic torque converter comprising the washer assembly is provided. The washer assembly comprises a washer and a plate; the washer is annular and comprises a washer body and two or more positioning clamps protruding radially inward from an inner periphery of the washer body, at least one side of the positioning clamp in a circumferential direction having a positioning protrusion protruding; the plate is annular, an inner periphery portion of the plate being provided with two or more positioning notches; an edge of at least one side of the positioning notch in the circumferential direction being provided with a positioning groove; and the washer is mounted to one end face of the plate. The washer assembly saves the internal space of the torque converter and saves the material cost of the washer.

13 Claims, 5 Drawing Sheets

(56) References Cited

U.S. PATENT DOCUMENTS

| | | | |
|---|---|---|---|
| 10,041,576 B2* | 8/2018 | Smith | F16H 41/24 |
| 10,428,921 B2* | 10/2019 | Subotic | F16H 41/24 |
| 10,598,212 B2* | 3/2020 | Lewis | F16C 17/047 |
| 2016/0273635 A1 | 9/2016 | Dattawadkar et al. | |
| 2017/0254397 A1 | 9/2017 | Subotic | |
| 2018/0003279 A1* | 1/2018 | Avins | F16H 41/24 |

FOREIGN PATENT DOCUMENTS

| | | |
|---|---|---|
| JP | 2004308865 A | 11/2004 |
| WO | 2006025178 A1 | 3/2006 |

\* cited by examiner

WASHER ASSEMBLY AND HYDRODYNAMIC TORQUE CONVERTER

CROSS-REFERENCE TO RELATED APPLICATIONS

This application is the U.S. National Phase of PCT Appln. No. PCT/CN2018/105698 filed Sep. 14, 2018, the entire disclosure of which is incorporated by reference herein.

TECHNICAL FIELD

The present disclosure relates to the technical field of washer, and more particularly to a thrust washer assembly of a hydrodynamic torque converter.

BACKGROUND

The United States patent publication US2016/0273635A1 discloses a hydrodynamic torque converter and discloses a configuration of a thrust washer. Referring to FIG. 1, the hydrodynamic torque converter includes a turbine 300, a stator 200 and an impeller 400 (also called a pump). The side portion of the stator 200 has a plate 201. The thrust washer 100 is connected to the plate 201 through a clip 101 located at the outer circumference of the thrust washer 100.

In this connection mode, the clip 101 extends beyond the outer periphery of the plate 201 and occupies a certain space inside the hydrodynamic torque converter. However, with the miniaturization of the size of the hydrodynamic torque converter, the space left for the outer peripheral portion of the thrust washer 100 is very limited, especially the space in the radial direction of the hydrodynamic torque converter. Therefore, the clip 101 in the existing connection mode restricts the internal compact structure design of the hydrodynamic torque converter. In addition, since the thrust washer 100 is mainly used to bear the axial thrust of the hydrodynamic torque converter, its manufacturing material (e.g., polyamide-imide, also called torlon) is usually expensive. However, the function of the clip 101 is only to fix the thrust washer 100 to the plate 201, and there is no need to bear a large thrust force in the axial direction of the thrust washer 100. Therefore, the clip 101 located at the outer circumference of the thrust washer 100 increases the material cost of the thrust washer 100 to a certain extent.

SUMMARY

The object of the present disclosure is to overcome or at least alleviate the above-mentioned shortcomings of the prior art, and to provide a thrust washer which can save the internal space of the hydrodynamic torque converter and the use cost of the material of the thrust washer.

According to a first aspect of the present disclosure, there is provided a washer assembly comprising a thrust washer and a plate;

wherein the thrust washer is substantially annular in shape and comprises a washer body and two or more positioning clamps protruding radially inward from an inner periphery of the washer body, at least one side of the positioning clamp in a circumferential direction having a positioning protrusion protruding in the circumferential direction, and the positioning protrusion defining a radial positioning portion of the thrust washer;

wherein the plate is substantially annular in shape, an inner periphery portion of the plate being provided with two or more positioning notches; an edge of at least one side of the positioning notch in the circumferential direction being provided with a positioning groove, and the positioning groove defining a radial positioning portion of the plate; and wherein the thrust washer is mounted to one end face of the plate, and in a mounted state, the positioning clamp extends into the positioning notch, and the radial positioning portion of the thrust washer and the radial positioning portion of the plate abut against each other or face each other with a small interval, thereby defining a radial position of the thrust washer relative to the plate.

In at least one embodiment, wherein the positioning groove further defines an axial positioning portion of the plate, and in the mounted state, part of the surface of the positioning protrusion abuts against the axial positioning portion of the plate, thereby preventing the thrust washer and the plate from being axially separated from each other.

In at least one embodiment, wherein in the mounted state, the washer body is in contact with a first end face of the plate, the plate further has a second end face opposite to the first end face, and the axial positioning portion and the second end face face the same direction.

In at least one embodiment, wherein the positioning notch defines a circumferential positioning portion of the plate, and in the mounted state, part of the surface of the positioning clamp abuts against the circumferential positioning portion of the plate, thereby preventing the thrust washer from rotating relative to the plate.

In at least one embodiment, wherein the positioning groove does not penetrate the plate in an axial direction, and in the mounted state, radially extending edges on both sides of the positioning clamp in the circumferential direction and opposite edges of the positioning groove in the circumferential direction form substantially complementary steps in shape.

In at least one embodiment, wherein at least part of the surface of the positioning protrusion is curved.

In at least one embodiment, wherein a middle part of the positioning clamp in the circumferential direction is provided with a cutout.

In at least one embodiment, wherein the two or more positioning clamps are evenly arranged in the circumferential direction of the thrust washer.

In at least one embodiment, wherein the radially extending edges of both sides of each positioning clamp in the circumferential direction each have the positioning protrusion, and the edges of both sides of each positioning notch in the circumferential direction each have the positioning groove.

In at least one embodiment, wherein an end face of the washer body remote from the plate has a plurality of load bearing portions spaced apart by liquid guide grooves, and an axial height of the washer body at the liquid guide grooves is smaller than an axial height of the washer body at the load bearing portions.

In at least one embodiment, wherein the axial height of the washer body at the load bearing portions is greater than a maximum axial height of the positioning clamp.

According to a first aspect of the present disclosure, there is provided a hydrodynamic torque converter comprising:
an impeller;
a stator; and
the washer assembly according to the first aspect of the present disclosure.

In at least one embodiment, wherein the plate of the washer assembly is located between the stator and the thrust washer, and an end face of the thrust washer remote from the plate abuts against an inner wall of the impeller.

DETAILED DESCRIPTION

Exemplary embodiments of the present disclosure will be described below with reference to the drawings. It should be understood that these specific descriptions are only intended to teach those skilled in the art how to practice the present disclosure, and are not intended to be exhaustive of all possible ways of carrying out the present disclosure or to limit the scope of the present disclosure.

The washer assembly comprises a thrust washer 1 and a plate 2 that can be mounted in a manner of matching each other. The thrust washer 1 and the plate 2 are both substantially annular in shape, and their positioning portions which are mounted in a matching manner are located at their inner periphery portions, respectively.

The specific mounting method of the thrust washer 1 and the plate 2 according to the present disclosure will be described with reference to FIGS. 2-8.

Figure 1:
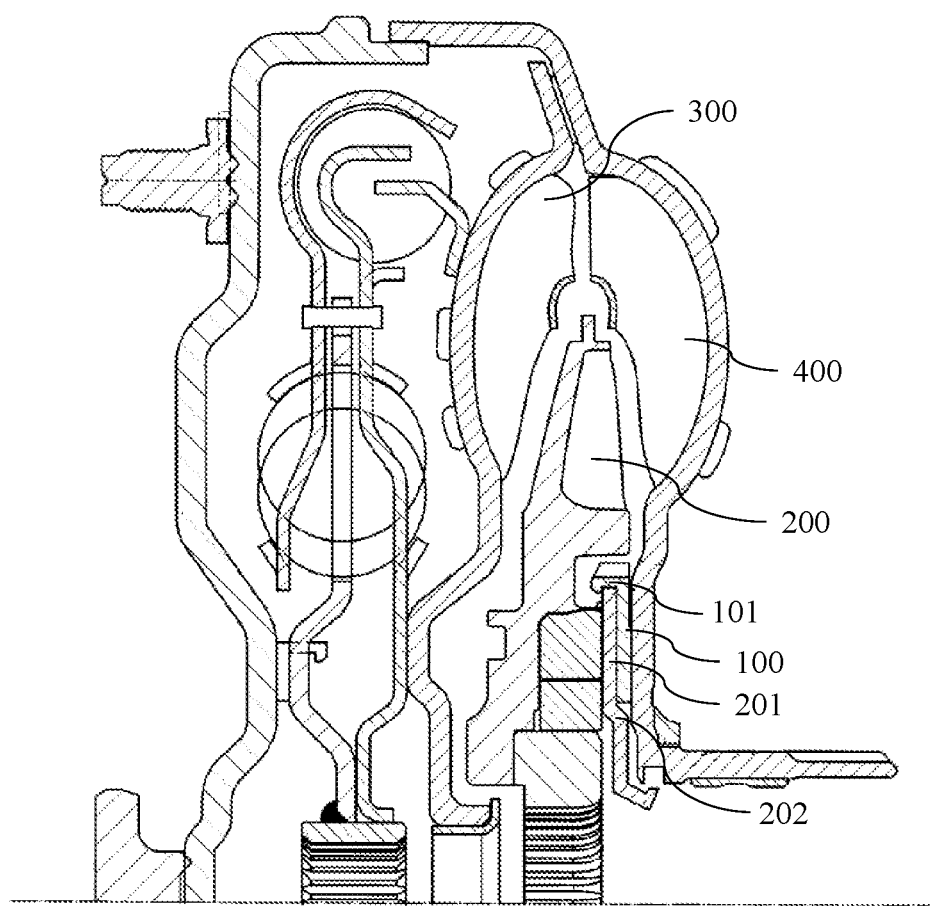
FIG. 1 shows half of an axial sectional view of a known hydrodynamic torque converter including a thrust washer.
Figure 2:
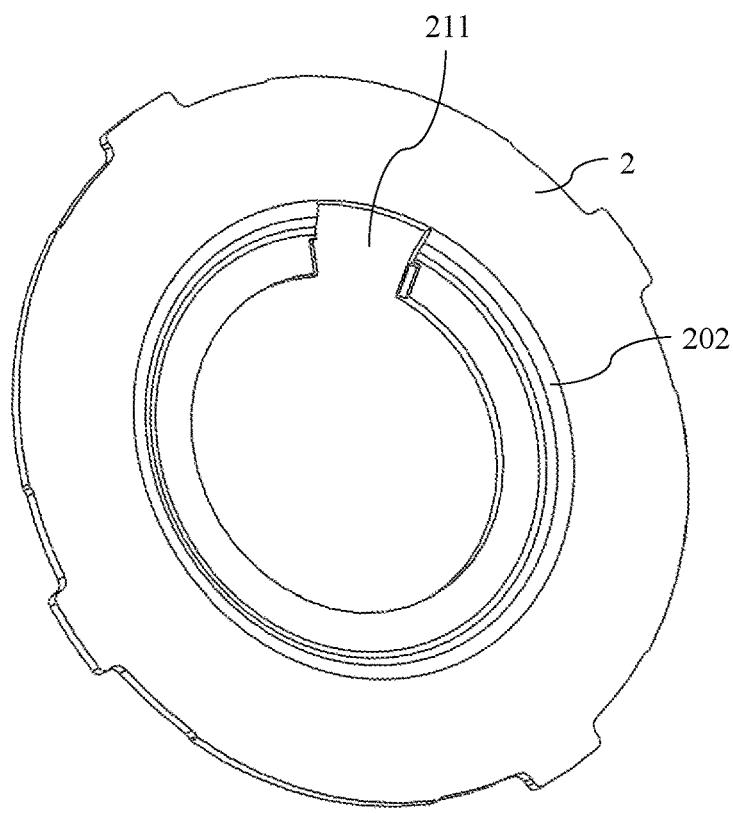
FIG. 2 shows a schematic view of a plate according to the present disclosure.
Figure 3:
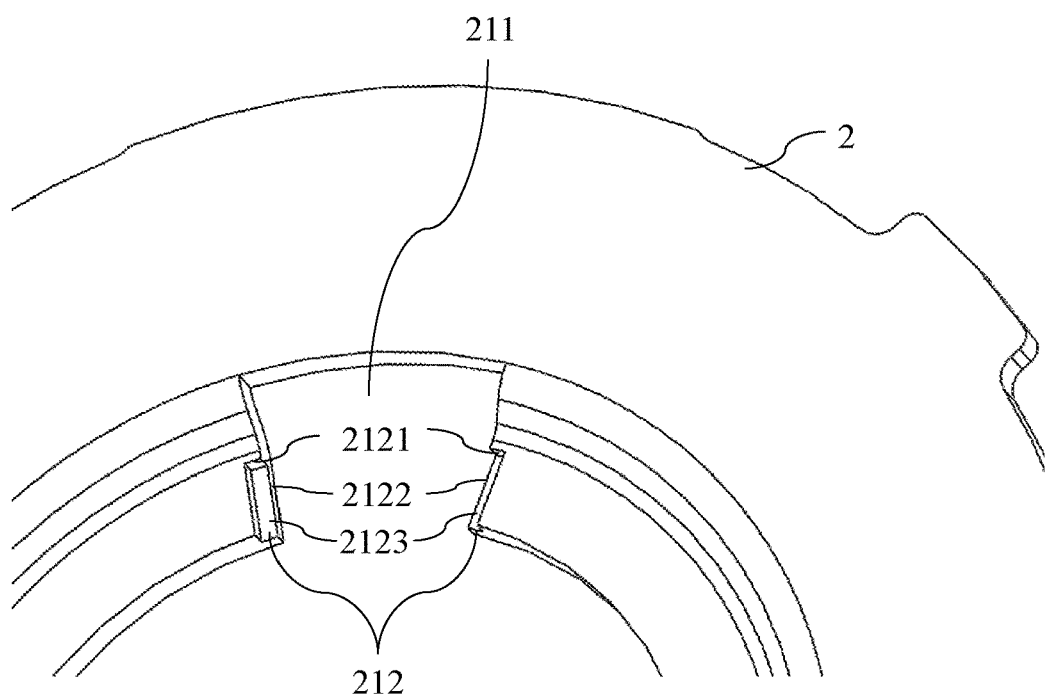
FIG. 3 shows a schematic view of a part of the plate according to the present disclosure.

First, the plate 2 will be described. Referring to FIG. 2, the inner periphery portion of the plate 2 projects axially relative to the outer periphery portion, especially toward the impeller (see the impeller 400 in FIG. 1). What connects the inner periphery portion and the outer periphery portion of the plate 2 is a curved portion 202. A positioning notch 211 locates at the inner periphery portion of the plate 2. It should be noted that FIG. 2 only schematically shows the plate 2 with one positioning notch 211. Preferably, the plate 2 generally includes more than two positioning notches 211 distributed along the circumferential direction. Preferably, for the thrust washer 1 shown in FIG. 4, there will be four positioning notches 211 on the corresponding plate 2 according to the present disclosure. Referring to FIG. 3, the two radial edges of each positioning notch 211 are each provided with a positioning groove 212. Preferably, the positioning grooves 212 do not penetrate the plate 2 but form steps on the two radial edges of the plate 2. Each positioning groove 212 has a radial positioning portion 2121 and an axial positioning portion 2123, respectively. The side walls on both sides of the positioning notch 211, which do not belong to the positioning groove 212, constitute the circumferential positioning portion 2122.

Figure 4:
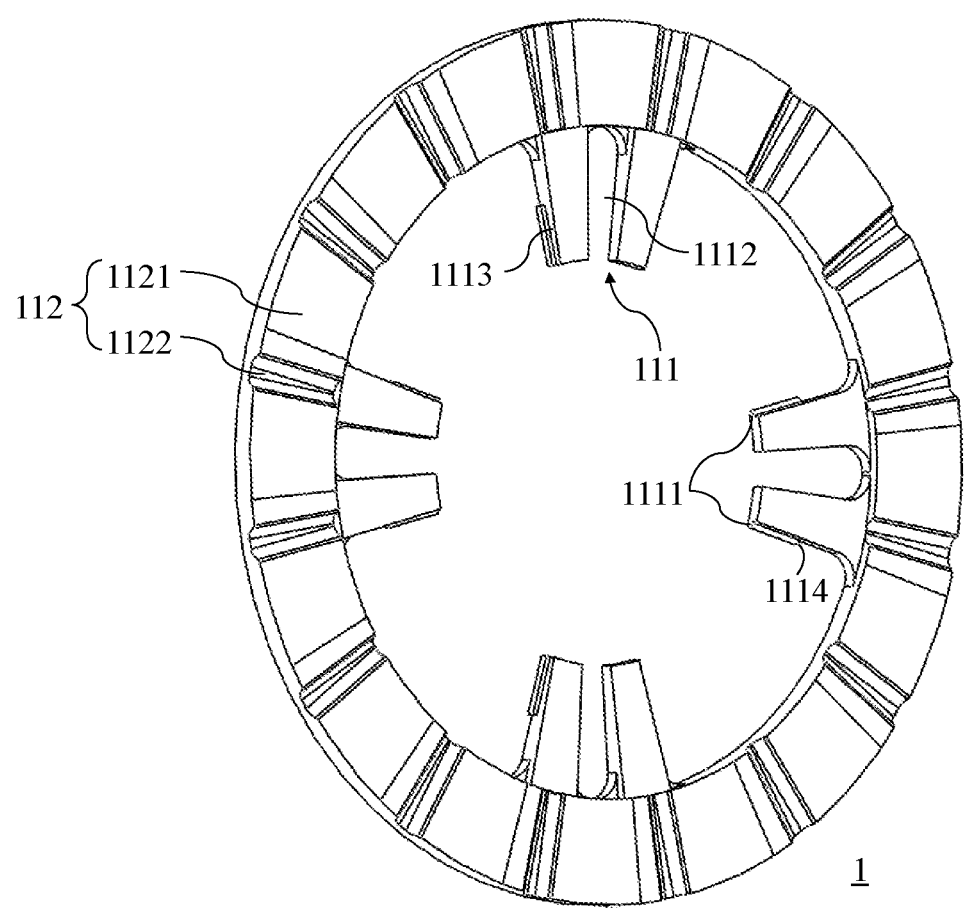
FIG. 4 shows a schematic view of the thrust washer according to the present disclosure.

Next, the thrust washer 1 will be described. Referring to FIG. 4, the thrust washer 1 comprises a washer body 112 and four positioning clamps 111 protruding radially inward from the inner periphery of the washer body 112. Each positioning clamp 111 has a cutout 1112 in its substantially central region in the circumferential direction, and the cutout 1112 defines two arms of the positioning clamp 111. When the thrust washer 1 and the plate 2 are fitted, each positioning clamp 111 of the thrust washer 1 exactly extends into one positioning notch 211 of the plate 2; preferably, each positioning clamp 111 forms a transition fit or interference fit with the positioning notch 211. The cutout 1112 provides deformation allowance for the two arms of the positioning clamp 111 to move closer to each other, thus facilitating the assembly of the thrust washer 1 and the plate 2, which will be more easily understood in the following description of the assembly process of the thrust washer 1 and the plate 2. The radially extending edges on both sides of each positioning clamp 111 in the circumferential direction each protrude outward with a positioning protrusion 1111. In the axial direction, the thickness of the positioning protrusion 1111 is smaller than the thickness of the main body portion of the positioning clamp 111, so that when the positioning clamp 111 is cut in a direction perpendicular to the radial direction, the cross section of the positioning clamp 111 at the positioning protrusion 1111 is stepped. The non-protruding portion of the stepped side portion of the positioning clamp 111 constitutes the circumferential positioning portion 1113. The positioning protrusion 1111 not only embodies the protrusion in the circumferential direction, but also embodies the protrusion in the radial direction; that is, the positioning protrusion 1111 does not extend to the joint between the positioning clamp 111 and the washer body 112 in the radial direction. The positioning protrusion 1111 forms a cross section near the washer body 112 in the radial direction, and the cross section constitutes the radial positioning portion 1114. Preferably, the cross-sectional edge of the positioning protrusion 1111 in a direction perpendicular to the radial direction is arc-shaped, which makes the process of fitting the thrust washer 1 and the plate 2 together smoothly. The present disclosure is certainly not limited thereto.

Figure 5:
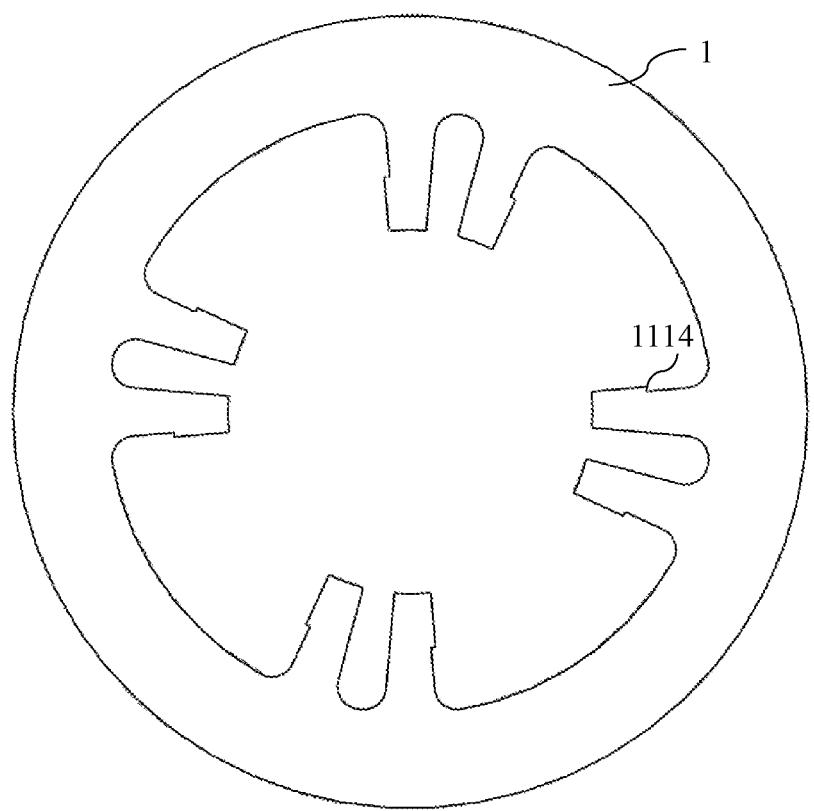
FIG. 5 shows a schematic view of a first face of the thrust washer according to the present disclosure.

Preferably, the end face of the thrust washer 1 facing the plate 2 during assembly is a flat plane, as shown in FIG. 5, and for convenience of description, this end face of the thrust washer 1 is called a first face of the thrust washer 1 and the end face of the thrust washer 1 opposite to the first face of the thrust washer 1 is called a second face of the thrust washer 1. The end face of the plate 2 facing the thrust washer 1 during assembly is called a first face of the plate 2 and the end face of the plate 2 opposite to the first face of the plate 2 is called a second face of the plate 2. Preferably, when the thrust washer assembly is applied to the hydrodynamic torque converter, the second face of the thrust washer 1 is formed with protrusions and recesses at intervals in the circumferential direction of the washer body 112. The protrusions constitute load bearing portions 1121 having at least partially flat surfaces for receiving axial thrust. The recesses constitute liquid guide grooves 1122 which extend from the outer peripheral portion to the inner peripheral portion of the washer body 112, providing a guide path for the circulation of liquid in the hydrodynamic torque converter. Since the positioning clamp 111 disposed inside the washer body 112 may interfere with the liquid guide grooves 1122, and it is preferable that the surface of the positioning clamp 111 located at the second face of the thrust washer 1 is not higher than the lowest position of the inner bottom face of the liquid guide groove 1122. Preferably, the maximum thickness of the positioning clamp 111 in the axial direction is equal to the minimum thickness of the washer body 112 at the liquid guide groove 1122. The present disclosure is certainly not limited thereto.

Figure 6:
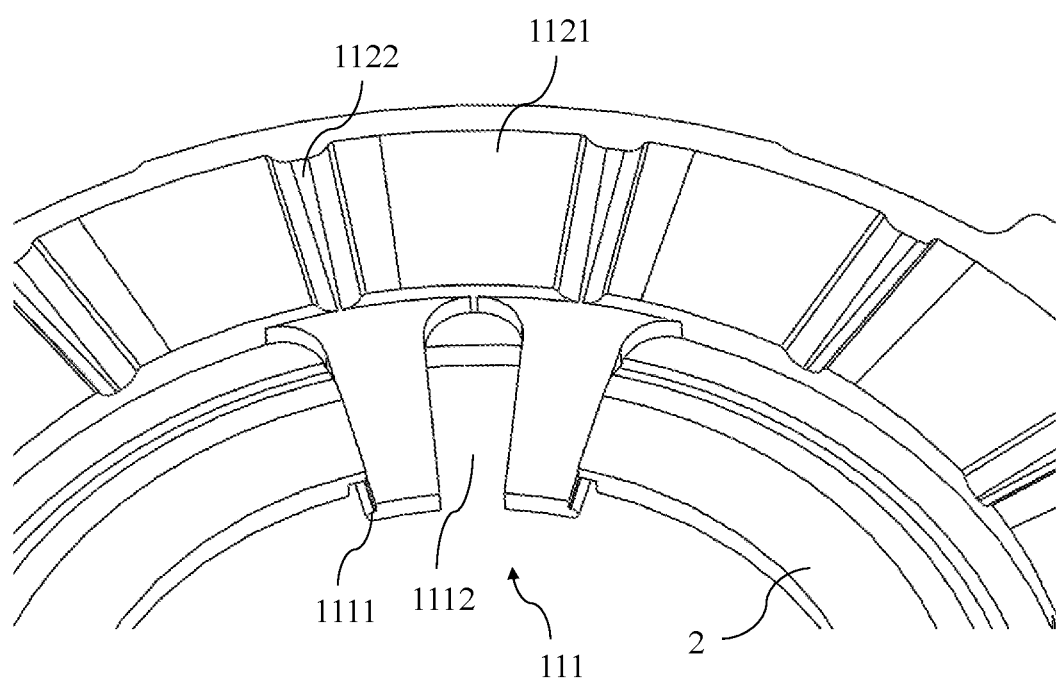
FIGS. 6 and 7 are schematic views showing a part of the mounted state of the thrust washer and the plate according to the present disclosure.
Figure 7:
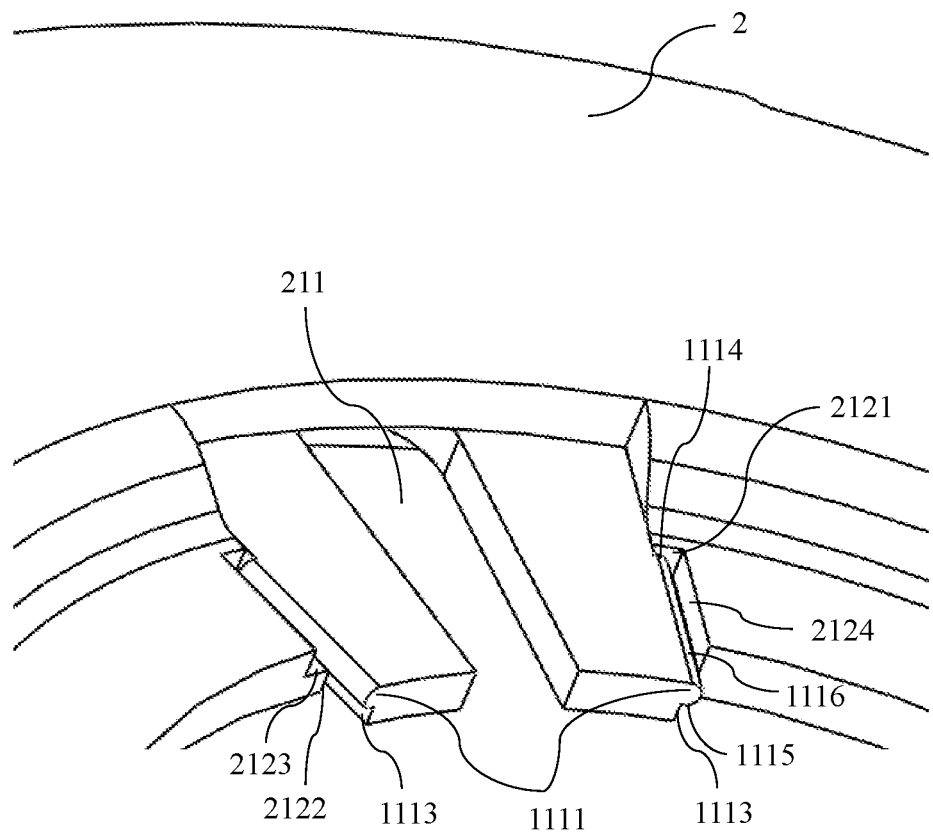
Figure 8:
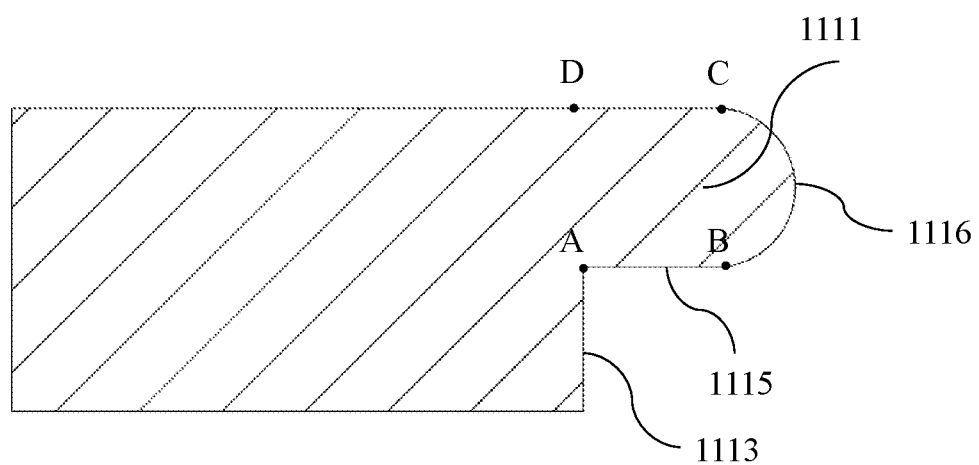
FIG. 8 shows a cross-sectional view of half of the positioning clamp of the thrust washer according to the present disclosure.

Next, with reference to FIGS. 6-8, how the positioning protrusion 1111 matches with the positioning groove 212 to realize the mating installation and positioning of the thrust washer 1 and the plate 2 will be described. The first face of the thrust washer 1 is placed on the first face of the plate 2 so that the positioning clamp 111 is embedded into the positioning notch 211. In this process, it is necessary to apply a certain pressure on the two arms of the positioning clamp 111 toward the cutout 1112, so that the two arms of the positioning clamp 111 are elastically deformed toward the cutout 1112 respectively and the positioning protrusion 1111 passes over the plate 2 and contacts the second face of the plate 2. The first face of the assembled thrust washer 1 at the washer body 112 is in contact with the first face of the plate 2, and the positioning protrusion 1111 is in contact with the axial positioning portion 2123 located on the second face of the plate 2, which prevents the thrust washer 1 from being axially separated from the plate 2. Due to the curved structure of the plate 2, i.e., the inner periphery portion of the plate 2 being closer to the thrust washer 1 (i.e., closer to the impeller side of the hydrodynamic torque converter) than the outer periphery portion, the positioning clamp 111 extends from the outer periphery portion of the plate 2 to the inner periphery portion of the plate 2, and there is no need or no obvious need for the positioning clamp 111 to be curved in the axial direction. In the circumferential direction, the circumferential positioning portions 1113 on both sides of the positioning clamp 111 abut against the circumferential positioning portions 2122 on the plate 2, so that the thrust washer 1 cannot rotate relative to the plate 2 in the circumferential direction. In the radial direction, the radial positioning portions 1114 of the positioning clamp 111 may abut against the radial positioning portions 2121 on the plate 2, or the two may face each other at small intervals. Preferably, the thrust washer 1 has at least two positioning clamps 111, and when the number of the positioning clamps 111 is two, the connecting line connecting the centers of the two positioning clamps 111 passes through the center of the thrust washer 1, i.e., the central angle of the two positioning clamps 111 being 180 degrees, which determines the position of the diameter of the thrust washer 1 and thus determines the position of the thrust washer 1 relative to the plate 2. When the number of the positioning clamps 111 is more than three, the three or more positioning clamps 111 are distributed at any central angle between one another in the circumferential direction on the inner side of the washer body 112, which determines the position of the apex of the inscribed polygon of the thrust washer 1 and thus determines the position of the thrust washer 1 relative to the plate 2. In the axial direction, first, the first face of the thrust washer 1 at the washer body 112 is in contact with the first face of the plate 2, thus positioning the thrust washer 1 relative to the plate 2 in the axial direction. Second, another axial positioning structure will be described with reference to FIG. 8. FIG. 8 is a cross-sectional view of one of the two arms of the positioning clamp 111 separated by the cutout 1112 in a direction perpendicular to the radial direction. The positioning protrusion 1111 includes a planar portion AB, a curved portion BC, and a planar portion CD, wherein the planar portion AB constitutes an axial positioning portion 1115 which abuts against the axial positioning portion 2123, thereby realizing the auxiliary axial positioning of the thrust washer 1. It should be understood that the present disclosure does not limit the radial length of the positioning clamp 111, and except for the implementing mode as shown in FIG. 7 in which the positioning clamp 111 is slightly protruded from the inner circumference of the plate 2 in the radial direction, the length of the positioning clamp 111 in the radial direction may also be flush with or shorter than the inner circumference of the plate 2.

It should be understood that the circumferential positioning of the thrust washer 1 is not limited to the match between the circumferential positioning portion 1113 on the thrust washer 1 and the circumferential positioning portion 2122 on the plate 2. Another possible method for positioning the thrust washer 1 will be described below. The side portion of the positioning protrusion 1111 in the circumferential direction constitutes a circumferential positioning portion 1116, and the side portion of the positioning notch 211 of the plate 2 in the circumferential direction has a circumferential positioning portion 2124; and the circumferential positioning portion 1116 forms a transition fit or interference fit with the circumferential positioning portion 2124, thereby realizing circumferential positioning of the thrust washer 1.

It should be understood that the match between the circumferential positioning portion 1113 and the circumferential positioning portion 2122 and the match between the circumferential positioning portion 1116 and the circumferential positioning portion 2124 can be used by selecting either of them or both of them. In addition, the circumferential positioning of the thrust washer 1 can also be realized without using the corresponding radial portion of the positioning protrusion 1111; for example, the positioning can be realized by matching the two side walls of the positioning clamp 111 on the radial outer side of the positioning protrusion 1111 with the corresponding side portions on the radial outer side of the positioning notch 211 of the plate 2.

It should be understood that it is not necessary that one positioning notch 211 corresponds to two positioning grooves 212. For example, the positioning groove 212 may be provided only on one side portion of the positioning notch 211. The positioning notch 211 need not be a left-right symmetrical structure.

It should be understood that it is not necessary to have one positioning protrusion 1111 on each side of the positioning clamp 111. For example, the positioning protrusion 1111 may be provided on only one side of the positioning clamp 111. The positioning clamp 111 need not be a left-right symmetrical structure.

It should be understood that the thickness of the positioning protrusion 1111 in the axial direction is not necessarily smaller than the thickness of the main body portion of the positioning clamp 111, and the thickness of the positioning protrusion 1111 may also be equal to the thickness of the main body portion of the positioning clamp 111. As for the positioning clamp 111 whose main body portion has a thickness equal to the thickness of the positioning protrusion 1111, the positioning of the thrust washer 1 in the circumferential direction of the plate 2 is realized through the match of the circumferential positioning portion 1116 and the circumferential positioning portion 2124.

It should be understood that the cutout 1112 of the positioning clamp 111 is not necessary, and when no cutout 1112 is provided, the mating installation of the thrust washer 1 and the plate 2 can also be realized by the elasticity of the material of the positioning clamp 111 and/or the deformation of the positioning clamp 111. When the cutout 1112 is provided, the present disclosure does not limit the depth of the cutout 1112 in the radial direction.

When applying the thrust washer assembly to the hydrodynamic torque converter, it is preferable that the plate 2 is used as a stator side plate, at which time the end face of the thrust washer 1 remote from the stator side plate abuts against the inner wall of the impeller of the hydrodynamic torque converter. However, it should be understood that the thrust washer assembly can also be used in other parts of the hydrodynamic torque converter. In addition, the thrust washer assembly according to the present disclosure not only can be used in hydrodynamic torque converters, but can also be applied to other devices requiring thrust washers.

The present disclosure has at least one of the following advantages:

(i) transferring the mating structure of the thrust washer and the plate from the outer periphery portion of the plate to the radial inner side region of the plate can free up the space near the outer periphery of the plate, making the interior of the hydrodynamic torque converter more compact and improving the space utilization rate;

(ii) the clip 101 located on the outer periphery portion of the thrust washer 100 is omitted, thus saving the manufacturing material of the thrust washer 100;

(iii) as for the annular thrust washer 1, compared with arranging the positioning clamp 111 on the radial outer side of the washer body 112, arranging the positioning clamp 111 on the radial inner side of the washer body 112 will obviously make the size of the positioning clamp 111 smaller (resulting from a smaller radius) and thus save material;

(iv) the structure of the plate 2 is simpler in that only a positioning notch including a positioning groove needs to be formed on the inner periphery portion of the plate, and the present disclosure can be applied to the already designed and molded plate blank, and the plate blank only needs to go through a material removal process so as to obtain the positioning notch;

(v) the skillful matching of the positioning groove 212 and the positioning protrusion 1111 can realize the circumferential, radial and axial positioning of the thrust washer 1 on the plate 2 at the same time.

Of course, the present disclosure is not limited to the above embodiments, and various modifications can be made to the above embodiments of the present disclosure by those skilled in the art under the teaching of the present disclosure, without departing from the scope of the present disclosure.

LIST OF REFERENCE NUMBERS 1. 100: thrust washer;
101: clip;
111: positioning clamp;
1111: positioning protrusion;
1112: cutout;
1113, 1116, 2122, 2124: circumferential positioning portions;
1114, 2121: radial positioning portions;
1115, 2123: axial positioning portions;
112: washer body;
1121: load bearing portion;
1122: liquid guide groove;
2. 201: plate;
202: curved portion;
211: positioning notch;
212: positioning groove;
200: stator;
300: turbine;
400: impeller;
A, B, C, D: auxiliary points on the surface of the positioning clamp 111.

The invention claimed is:

1. A washer assembly comprising a thrust washer and a plate;
wherein the thrust washer is substantially annular in shape and comprises a washer body and two or more positioning clamps protruding radially inward from an inner periphery of the washer body, at least one side of a positioning clamp in a circumferential direction having a positioning protrusion protruding in the circumferential direction, and the positioning protrusion defining a radial positioning portion of the thrust washer;
wherein the plate is substantially annular in shape, an inner periphery portion of the plate being provided with two or more positioning notches; an edge of at least one side of a positioning notch in the circumferential direction being provided with a positioning groove, and the positioning groove defining a radial positioning portion of the plate; and
wherein the thrust washer is mounted to one end face of the plate, and in a mounted state, the positioning clamp extends into the positioning notch, and the radial positioning portion of the thrust washer and the radial positioning portion of the plate abut against each other or face each other with a small interval, thereby defining a radial position of the thrust washer relative to the plate.

2. The washer assembly according to claim 1, wherein the positioning groove further defines an axial positioning portion of the plate, and in the mounted state, part of a surface of the positioning protrusion abuts against the axial positioning portion of the plate, thereby preventing the thrust washer and the plate from being axially separated from each other.

3. The washer assembly according to claim 2, wherein in the mounted state, the washer body is in contact with a first end face of the plate, the plate further has a second end face opposite to the first end face, and the axial positioning portion and the second end face face the same direction.

4. The washer assembly according to claim 1, wherein the positioning notch defines a circumferential positioning portion of the plate, and in the mounted state, part of a surface of the positioning clamp abuts against the circumferential positioning portion of the plate, thereby preventing the thrust washer from rotating relative to the plate.

5. The washer assembly according to claim 1, wherein the positioning groove does not penetrate the plate in an axial direction, and in the mounted state, radially extending edges on both sides of the positioning clamp in the circumferential direction and opposite edges of the positioning groove in the circumferential direction form substantially complementary steps in shape.

6. The washer assembly according to claim 1, wherein at least part of a surface of the positioning protrusion is curved.

7. The washer assembly according to claim 1, wherein a middle part of the positioning clamp in the circumferential direction is provided with a cutout.

8. The washer assembly according to claim 1, wherein the two or more positioning clamps are evenly arranged in the circumferential direction of the thrust washer.

9. The washer assembly according to claim 5, wherein the radially extending edges of both sides of each positioning clamp in the circumferential direction each have the positioning protrusion, and the edges of both sides of each positioning notch in the circumferential direction each have the positioning groove.

10. The washer assembly according to claim 1, wherein an end face of the washer body remote from the plate has a plurality of load bearing portions spaced apart by liquid guide grooves, and an axial height of the washer body at the liquid guide grooves is smaller than an axial height of the washer body at the load bearing portions.

11. The washer assembly according to claim 10, wherein the axial height of the washer body at the load bearing portions is greater than a maximum axial height of the positioning clamp.

12. A hydrodynamic torque converter comprising:
an impeller;
a stator; and
the washer assembly according to claim 1.

13. The hydrodynamic torque converter according to claim 12, wherein the plate of the washer assembly is located between the stator and the thrust washer, and an end face of the thrust washer remote from the plate abuts against an inner wall of the impeller.

\* \* \* \* \*